US012397961B2

(12) United States Patent
Wallin et al.

(10) Patent No.: US 12,397,961 B2
(45) Date of Patent: Aug. 26, 2025

(54) FOLDABLE BOX AND METHOD OF MANUFACTURING THEREOF

(71) Applicant: Taitos Oy

(72) Inventors: Eeva Wallin, Turku (FI); Inkeri Pääkkö, Tampere (FI)

(73) Assignee: Taitos Oy, Turku (FI)

(*) Notice: Subject to any disclaimer, the term of this patent is extended or adjusted under 35 U.S.C. 154(b) by 66 days.

(21) Appl. No.: 18/567,144

(22) PCT Filed: Jun. 29, 2022

(86) PCT No.: PCT/FI2022/050479
§ 371 (c)(1),
(2) Date: Dec. 5, 2023

(87) PCT Pub. No.: WO2023/275444
PCT Pub. Date: Jan. 5, 2023

(65) Prior Publication Data

US 2024/0262564 A1 Aug. 8, 2024

(30) Foreign Application Priority Data

Jun. 30, 2021 (FI) ..................................... 20215773
Sep. 16, 2021 (FI) ..................................... 20215979

(51) Int. Cl.
*B65D 5/32* (2006.01)
*B31B 50/16* (2017.01)
(Continued)

(52) U.S. Cl.
CPC .............. *B65D 5/326* (2013.01); *B31B 50/16* (2017.08); *B31B 50/62* (2017.08); *B31B 50/88* (2017.08);
(Continued)

(58) Field of Classification Search
CPC .......... B65D 5/326; B65D 65/40; B65D 5/28; B65D 5/62; B65D 2203/00; B65D 5/2076;
(Continued)

(56) References Cited

U.S. PATENT DOCUMENTS 1,339,339 A * 5/1920 Hoffman .................. B65D 5/62 229/101
3,194,474 A * 7/1965 Rumberger .......... B65D 5/0227 493/137
(Continued)

FOREIGN PATENT DOCUMENTS

CN 112874973 A 6/2021
JP 3188708 U 2/2014
(Continued)

OTHER PUBLICATIONS

European Patent Office, Notification of Transmittal of the International Search Report and the Written Opinion of the International Search Authority, or the Declaration, International Application No. PCT/FI2022/050479, Mailed Sep. 8, 2022, 13 pages.
(Continued)

*Primary Examiner* — Christopher R Demeree
(74) *Attorney, Agent, or Firm* — Ziegler IP Law Group, LLC.

(57) ABSTRACT

A foldable box has a first element and a second element. The first element has a stack of a first layer and a second layer, wherein the first layer has a first surface and a second surface opposite to the first surface. The second surface has an adhesive coating, and wherein the second layer is arranged to partially cover the second surface. Furthermore, the second layer has an opening to partially expose the adhesive coating of the first layer. Moreover, the second element has at least three pivotably connected parts, wherein at least one of the at least three pivotably connected parts is arranged to
(Continued)

be in contact with the exposed part of the adhesive coating of the first layer.

10 Claims, 19 Drawing Sheets

(51) Int. Cl.

| | |
|---|---|
| ***B31B 50/62*** | (2017.01) |
| ***B31B 50/88*** | (2017.01) |
| ***B31B 105/00*** | (2017.01) |
| ***B31B 120/30*** | (2017.01) |
| ***B65D 65/40*** | (2006.01) |

(52) U.S. Cl.
CPC ........ *B65D 65/40* (2013.01); *B31B 2105/001* (2017.08); *B31B 2120/302* (2017.08)

(58) Field of Classification Search
CPC ......... B31B 50/16; B31B 50/62; B31B 50/88; B31B 2105/001; B31B 2120/302
USPC ............ 229/122.27, 117.32, 122.24, 122.26, 229/164.1, 164.2, 182, 919; 156/226; 206/449, 459.5; 220/6
See application file for complete search history.

(56) References Cited

U.S. PATENT DOCUMENTS

| | | | | | |
|---|---|---|---|---|---|
| 4,254,871 | A * | 3/1981 | Poore | B65D 75/327 | 206/820 |
| 5,215,248 | A | 6/1993 | Moser | | |
| 5,333,779 | A | 8/1994 | Sykora et al. | | |
| 5,441,154 | A | 8/1995 | Youell, III | | |
| 6,168,074 | B1 * | 1/2001 | Petriekis | B65D 77/065 | 229/122.26 |
| 9,079,682 | B2 * | 7/2015 | Adams | B65D 81/36 | |
| 2005/0263577 | A1 * | 12/2005 | Walsh | B65D 5/4266 | 229/117.32 |
| 2006/0138018 | A1 * | 6/2006 | McDonald | B65D 5/5021 | 206/583 |
| 2014/0209496 | A1 | 7/2014 | Flynn et al. | | |
| 2020/0207509 | A1 | 7/2020 | Hisamitsu | | |

FOREIGN PATENT DOCUMENTS

| | | | |
|---|---|---|---|
| WO | 2010025637 | A1 | 3/2010 |
| WO | 2011002884 | A2 | 1/2011 |

OTHER PUBLICATIONS

Finnish Patent and Registration Office, Search Report, Application No. 20215979, Mailed Nov. 24, 2021, 2 pages.

* cited by examiner

FOLDABLE BOX AND METHOD OF MANUFACTURING THEREOF

TECHNICAL FIELD

The present disclosure relates generally to foldable boxes; and more specifically, to foldable boxes and methods of manufacturing foldable boxes.

BACKGROUND

In the recent past, product packaging has been an important part of the consumer products distribution and sales process. The product packaging safely retains consumer products, protecting them from potential damage. Notably, because of the variety of uses, boxes come in a variety of sizes and shapes, and range from boxes that hold a small piece of jewellery to ones that hold computers. Additionally, in order to protect a consumer product, the product packaging must be strong. Typically, these boxes are made of cardboard, corrugated paperboards and the like.

Generally, in order to save space during transportation and storage, boxes used for product packaging are either collapsible or foldable. These boxes are shipped flat and need to be constructed by the users of the box. To construct these boxes, the user must unfold the box and place certain folds into certain slots. Such collapsible or foldable boxes provide are efficient in terms of space consumption during transportation and storage. However, such foldable boxes can lack structural integrity and durability. Furthermore, such foldable boxes may not be aesthetically appealing to consumers and therefore, may not be suited as product packaging for high-end products.

A foldable box used for high-end product packaging is described in CN112874973A. The packaging box in CN 112874973A is shaped like a flat plate before use. The packaging box contains four side plates which form a rectangle, thus forming the side circumference of the packaging box, and in addition lining papers that cover the side circumference of the packaging box. An advantage is that it is suitable for efficient storage and transportation. Another advantage is that it may provide structural durability.

In recent decades, when a durable and aesthetically appealing packaging box is required, product manufacturers have started using pre-formed three-dimensional boxes. These boxes are fully pre-formed in a manufacturing facility and shipped in their three-dimensional form. However, such pre-formed three-dimensional boxes consume a large amount of space during transportation and storage, thereby leading to higher shipping costs and requiring larger storage spaces. Additionally, such boxes are also more susceptible to damage when shipped in the three-dimensional form. Furthermore, designed specifically manufacturing equipment are required for construction of such pre-formed boxes.

Therefore, in light of the foregoing discussion, there exists a need to overcome the aforementioned drawbacks associated with packaging boxes.

SUMMARY

The present disclosure seeks to provide a foldable box. The present disclosure also seeks to provide a box folded from the foldable box. The present disclosure also seeks to provide a method for manufacturing a foldable box. An aim of the present disclosure is to provide a solution that overcomes at least partially the problems encountered in prior art.

In one aspect, the present disclosure provides a foldable box that is a flat structure, when unfolded, and forms a box, when folded, the foldable box comprising a first element and a second element, wherein

- the first element comprising a stack of a first layer and a second layer, wherein the first layer has a first surface and a second surface opposite to the first surface, the second surface having an adhesive coating, and wherein the second layer is arranged to partially cover the second surface, so that the second layer has an opening to partially expose the adhesive coating of the first layer; and
- the second element comprising at least three pivotably connected parts, wherein, when the foldable box is folded, the second element is arranged to be in contact with the exposed part of the adhesive coating of the first layer in a manner that each of said pivotably connected parts overlaps with the adhesive coating of the first layer, and the first layer attaches to and covers the outer sides of the second element forming an outer surface of the foldable box.

According to this aspect, the first element further comprises at least one excess portion to attach the foldable box; said excess portion having the shape and size of an adjacent pivotably connected part of the at least three pivotably connected part to cover outer side of said adjacent pivotably connected part throughout.

In another aspect, the present disclosure provides a box folded from the aforementioned foldable box.

In yet another aspect, the present disclosure provides a method of manufacturing a foldable box comprising

- providing a first sheet of material comprising a first layer and a second layer, wherein the first layer has a first surface and a second surface opposite to the first surface, the second surface has an adhesive coating, and the second layer covers the adhesive coating on the second surface;
- cutting a form of the first sheet of material;
- removing a part of the second layer to expose the adhesive coating of the first layer to obtain a second element;
- providing a second element comprising at least three pivotably connected parts;
- arranging for each of said at least three pivotably connected parts on the first element to be in contact with the exposed adhesive coating of the first layer;
- folding said at least three pivotably connected parts inwards along bevelled groove lines to form a box like structure wherein said pivotably connected parts form the sides of the box;
- removing the second layer from excess portion covering the adhesive surface of the first layer;
- folding the excess portion inwards and gluing the first layer to the outer sides of the at least three pivotably connected parts so that adhesive surface of the first layer is towards outer sides of the second element to cover the second element and form an outer surface of the foldable box, and
- attaching the first element to the second element so that the first element covers all outer surfaces of the second element.

Embodiments of the present disclosure substantially eliminate or at least partially address the aforementioned problems in the prior art and enable foldable boxes that are rigid when erected and doesn't lose the structural integrity. Beneficially, the present disclosure eliminates requirement extra space while transportation as these foldable boxes can be stacked in flat position.

Additional aspects, advantages, features and objects of the present disclosure would be made apparent from the drawings and the detailed description of the illustrative embodiments construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1A:
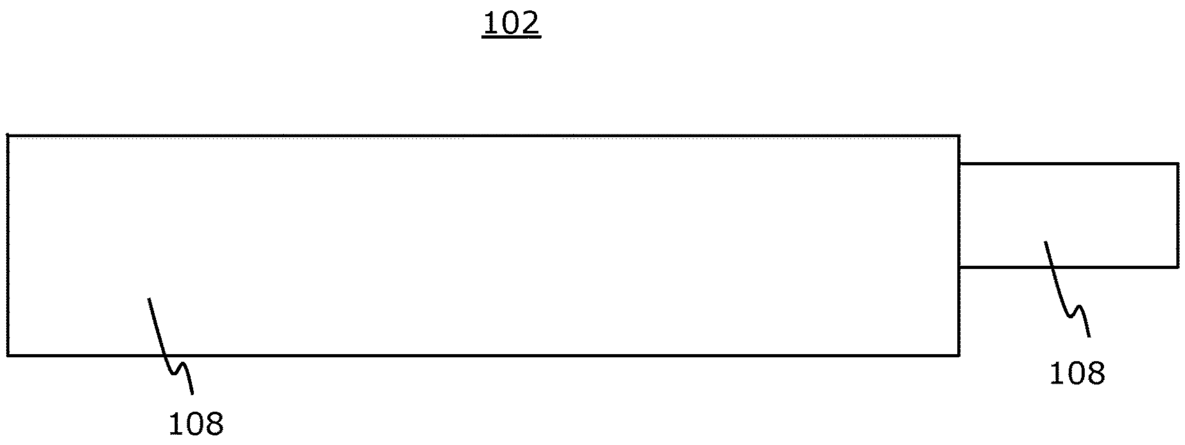
FIGS. 1A and 1B collectively illustrate a foldable box, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, the present disclosure provides a foldable box that is a flat structure, when unfolded, and forms a box, when folded, the foldable box comprising a first element and a second element, wherein

- the first element comprising a stack of a first layer and a second layer, wherein the first layer has a first surface and a second surface opposite to the first surface, the second surface having an adhesive coating, and wherein the second layer is arranged to partially cover the second surface, so that the second layer has an opening to partially expose the adhesive coating of the first layer; and
- the second element comprising at least three pivotably connected parts, wherein, when the foldable box is folded, the second element is arranged to be in contact with the exposed part of the adhesive coating of the first layer in a manner that each of said pivotably connected parts overlaps with the adhesive coating of the first layer, and the first layer attaches to and covers the outer sides of the second element forming an outer surface of the foldable box.

According to this aspect, the first element further comprises at least one excess portion to attach the foldable box; said excess portion having the shape and size of an adjacent pivotably connected part of the at least three pivotably connected part to cover outer side of said adjacent pivotably connected part throughout.

In another aspect, the present disclosure provides a box folded from the aforementioned foldable box.

In yet another aspect, the present disclosure provides a method of manufacturing a foldable box comprising

- providing a first sheet of material comprising a first layer and a second layer, wherein the first layer has a first surface and a second surface opposite to the first surface, the second surface has an adhesive coating, and the second layer covers the adhesive coating on the second surface;
- cutting a form of the first sheet of material;
- removing a part of the second layer to expose the adhesive coating of the first layer to obtain a second element;
- providing a second element comprising at least three pivotably connected parts;
- arranging for each of said at least three pivotably connected parts on the first element to be in contact with the exposed adhesive coating of the first layer;
- folding said at least three pivotably connected parts inwards along bevelled groove lines to form a box like structure wherein said pivotably connected parts form the sides of the box;
- removing the second layer from excess portion covering the adhesive surface of the first layer;
- folding the excess portion inwards and gluing the first layer to the outer sides of the at least three pivotably connected parts so that adhesive surface of the first layer is towards outer sides of the second element to cover the second element and form an outer surface of the foldable box, and attaching the first element to the second element so that the first element covers all outer surfaces of the second element.

The present disclosure aims to provide a foldable box, a box folded from the foldable box and a method of manufacturing the foldable box. Notably, the foldable box of the present disclosure can be stacked in an unfolded position. Consequently, when needed, the foldable box can be folded into a box structure. Moreover, the foldable box and method of the present disclosure eliminates the need of extra space during transportation and warehousing of empty boxes. Additionally, the folded boxes are aesthetically appealing and durable. Furthermore, as the foldable boxes are stacked in a flat position, the structural integrity is not lost. Additionally, the boxes provide rigidity as tough material is used in the making. Herein, a foldable box refers to a box which is not folded i.e., is in a flat structure. The foldable box structure can be folded to produce the folded box.

The system comprises a first element, and wherein, the second layer having an opening to partially expose the adhesive coating of the first layer. Herein, the first element is a cover element that forms the outer surface of the box. Notably, the first element is essentially a single sheet of material with minimal thickness that can cover the second element to provide structure and shape to the folded box. The first element comprises a stack of a first layer and a second layer, wherein the first layer has a first surface and a second surface opposite to the first surface, the second surface having an adhesive coating. Notably, the first surface of the first layer forms the outer surface of the foldable box, when folded and the second surface having the adhesive coating thereon enables the first element to adhere to the second element. The second layer is arranged to partially cover the second surface. In other words, the second layer partially covers the adhesive coating on the second surface and is arranged to keep the adhesive coating on the second surface of the first layer free from contact with air and other contaminants. Furthermore, the second layer prevents the adhesive coating of the first layer from drying. Moreover, the second layer has an opening that exposes the adhesive coating of the first layer. Herein, the opening in the second layer provides a space for the second element to come in contact with the first element. Moreover, once both the elements are in contact, the second layer of the first element can be removed (namely, peeled) in a methodical manner to expose the adhesive coating, thereby allowing different parts of the second element to be attached to the first element.

Examples of the material used for manufacturing of the first layer, includes but is not limited to, paper and paper products, natural and synthetic fabrics, polymers.

It will be appreciated that the first element is manufactured using materials which are highly flexibly and can be folded without any splitting, breaking, or fragmenting. Such material allows the first element, specifically the first layer of the first element, to be conveniently folded around the second element when folding the foldable box to obtain the folded box. Furthermore, the material for the second element is selected such that it can be easily peeled away from the adhesive coating without damaging the adhesive coating or leaving any residue thereupon, for example, a paper or plastic-based release liner.

Optionally, the first surface of the first layer has printed information thereon. Herein, printed information refers to product printing, product information, logo, date of manufacture, date of expiry and the like. The printed information may also include patterns, for example graphic patterns, symbols and/or figures in different colours or shades of grey. Optionally, the printing is performed when the first element is in unfolded condition or when folded to a box structure or a combination of both.

Moreover, information like product name, product logo and the like may be printed when the first element is in unfolded condition and further, information like date of manufacture, expiry, batch number and the like may be printed at a later stage when the foldable box is folded. Product printing is often required at a stage just before packing the product in the folded box. Furthermore, the information is printed using a printer or with the use of a hand-held stamp or both. Notably, the printed information is printed on all the sides of the box or on a pre-defined side. Herein, the printing varies based on a type of the product.

Optionally, the first layer of the first element comprises scores that are covered by the second layer of the first element, wherein the first element is to be folded along the scores. Herein, scores refer to creases or perforation on the first layer of first element that allows easier folding thereof. Typically, scores are made using a piece of metal to compress the fibres of the first element in one small area in order to create a dip in the first element where it can easily fold. Additionally, scores enable the first element to be folded without buckling or cracking while being folded, and it decreases the chance that the folding process will hurt the printed information that is delicately placed on the first surface of first layer. Notably, the first layer of the first element has scores which are covered by the second layer. The scores ensure easy and proper folding of the first element after the second layer is removed. Moreover, the scores help in getting cleaner looking boxes and add-on to maintain the structural integrity of the folded boxes.

The foldable box comprises the second element. Herein, the second element is manufacture using, but not limited to, cardboard, paperboard, plastic, polymer. Additionally, the material used in the manufacturing of the second element is comparatively rigid and strong than the first element. The second element comprises at least three pivotably connected parts, wherein at least one of the at least three pivotably connected parts is arranged to be in contact with the exposed part of the adhesive coating of the first layer. Notably, the at least three parts are pivotably connected to provide structure and rigidity to the foldable box. Typically, at least one of the three pivotably connected parts of the second element is arranged to be in contact with the adhesive coating of the first element. Moreover, the second element is placed on the first element in a manner that at least one of the at least three pivotably connected parts overlaps with the opening of the first element.

Accordingly, in an exemplary embodiment, the second element comprise four pivotably connected parts (i.e., four sides of the foldable box), wherein each of the four pivotably connected parts is arranged to be in contact with the exposed part of the adhesive coating of the first layer. Notably, said four parts are pivotably connected to provide structure and rigidity to the foldable box. Each of the four pivotably connected parts of the second element is arranged to be in contact with the adhesive coating of the first element. Moreover, the second element is placed on the first element in a manner that each of the four pivotably connected parts overlaps with the opening of the first element.

Herein, the first element is attached to the second element using the adhesive coating on the second surface of the first layer of first element. Furthermore, when the box is folded, the second element forms the rigid inner side and gives structure to the first element and shape to the box. Notably, the shape of the second element depends on the required shape of the box, when folded. Specifically, the number of pivotably connected parts depends on the required shape of the box. For example, four pivotably connected parts for a four-sided box, five pivotably connected parts for a five-sided box and so forth. The shape and size of the pivotable connected parts may vary depending on the shape and size of the box. For example, a four-sided box may have four pivotably connected parts of the same shape and the same size.

It will be appreciated that for folding the foldable box, the second element is arranged on the opening in the second layer of the first element. Notably, prior to folding, the foldable box is substantially a two-dimensional structure, wherein the at least three pivotably connected parts are conjoined with each other using the first element (specifically, the first layer) to obtain a three-dimensional folded box.

Optionally, the second element comprises bevelled groove lines along connecting edges of the at least three pivotably connected parts, wherein the bevelled groove lines enable fitting of the at least three pivotably connected parts when folded. Herein, the bevelled groove lines are obtained by chamfering the edges of at least three pivotably connected parts only along the edges that connect to each other during folding of the foldable box. The bevelled groove lines form a V-shaped structure that is not perpendicular to the faces of the piece between two pivotably connected parts that facilitates mating of a given connected part with another. Notably, at least three pivotably connected parts are required to form a closed structure. The number of pivotably connected parts and the degree of angle of the bevelled groove lines depends on the shape of the box.

In an embodiment, the second element, when folded, forms sides of the foldable box and the foldable box further comprises a base element that is adhesively attachable to the sides of the foldable box and that forms a base thereof. Herein, the base element refers to an additional element that forms the base of the box when attached to the already formed sides of the box. Additionally, the base part is a separate element and is essential in order to complete the structure of the folded box. The base element is made of a similar material as the second element to provide rigidity. Notably, the base material is glued to the first element having an opening in the shape of the base, wherein, the shape of the base depends on the number of pivotably connected parts which further depends on the shape of the box. Furthermore, once the sides are formed by folding the pivotably connected parts, the base element is then placed in a way that the remaining adhesive surface of the base element gets adhesively attached to the inner sides of the box.

In an exemplary embodiment, the first element comprises the first layer with the adhesive coating on second surface of the first layer, and the second layer. The second surface is covered with the second layer. Additionally, the second layer has an opening to expose the adhesive second surface of the first layer. Moreover, the second element comprises a first part, a second part, a third part and a fourth part. The first part is attached to the second part via the bevelled groove line. Similarly, the second part is connected to third part and the third part is connected to the fourth part. Since the second element has four parts, the foldable box can be folded into a folded box having a cuboidal shape, wherein the four parts form the sides of the cuboid. Furthermore, the groove line is processed preferably to have a 45-degree angle with a surface of the second element to enable folding of cuboidal box. Notably, the second element is placed to overlap the opening of the second layer of the first element. Moreover, the first part, the second part, the third part, and the fourth part of said pivotably connected parts are made to be in contact with the opening of the first element. Thus, all pivotably parts of the second element attach to the opening of the first element. Optionally, the adhesive surface of the first element is then folded inwards and is attached to sides of the second element. The second layer is removed completely to expose the adhesive coating of the first layer and the pivotably connected parts are folded. Thereafter, the four connected parts are along the bevelled groove lines in such a way that the fourth part of the second element mates with the first part of the second element. The box structure of the foldable box is closed/attached by connecting the adhesive coating of the first layer of the first element to the adjacent pivotably connected part of the second element that is completely covered with the first element. Said attachment is accomplished by the excess portion of the first element. Thus, after attachment, the outer surface of the adjacent side has two layers of the first element that cover the adjacent pivotally connected part and form a flat outer surface over it. Finally, a base part is separately constructed using a base shaped first element and a second element. Additionally, the base element is inserted from the top and is adhesively attached to the already formed sides of box. Such construction of the foldable box is illustrated further using FIGS. 1A, 1B, 1C, 1D, 1E, 1F, 1G, 2A, 2B, 3A, 3B and 4.

In another embodiment, the second element further comprises a base part connected to the at least three pivotably connected parts, and wherein, when folded, the at least three pivotably connected parts form sides of the foldable box and the base part forms a base of the foldable box. Herein, the base part is an integral part of the second element which is further connected to the sides of the at least three pivotably connected parts. Notably, the base part forms the centre of the second element and the at least three pivotably connected parts are connected via the sides around it. The shape of the base depends on the number of pivotably connected parts which further depends on the shape of the box. Furthermore, when folded around the bevelled groove lines, the at least three pivotably connected parts forms the sides of the foldable box and the base part forms the base of the foldable box.

In an exemplary embodiment, the first element comprises the first layer with the adhesive coating on the second surface of the first layer, and the second layer. Additionally, the second layer has an opening to expose the adhesive second surface of the first layer. Both layers, the first layer and the second layer, may be equal or different in size and shape, and may be arranged to be in contact with each other. Moreover, the second element comprises a first part, a second part, a third part, a fourth part and a base part. The base part is connected to the first part, second part, third part and the fourth part via bevelled groove lines. Furthermore, the second element is placed on top of the first element in such a way that the first part, the second part, the third part, the fourth part and the base part are in contact with the opening of the adhesive surface of the first layer of the first element. Notably, the first, second, third and fourth part can be pivotably turned in 90 degrees angle along the bevelled groove lines with respect to surface of the base part to form a cuboid box like structure. Additionally, part of second layer covering the adhesive surface can be removed and the first layer can be thus also glued to the other folded sides of the second element. In this embodiment, the attachment of the foldable box is accomplished by four excess portions of the first element. Each said excess portion has the shape and size of the adjacent pivotably connected part to cover outer side of said adjacent pivotably connected part throughout. Finally, a folded box with four sides and a base part is formed from the foldable box. Advantageously, the size and shape of the opening of the adhesive surface of the first layer of the first element and the size and shape of the second element correspond to each other so that the second element completely covers the exposed adhesive surface when attached. Such construction of the foldable box is illustrated further using FIGS. 6A, 6B, 6A, 6B, 7A, 7B and 7C.

The present disclosure further provides a box folded from the foldable box as described above. Herein, the resulting folded box is formed from the foldable box. Notably, the folded box comprises the first element and the second element wherein, the second element is connected to the first element using the adhesive coating on the first element.

The present disclosure also relates to the method as described above. Various embodiments and variants disclosed above apply mutatis mutandis to the method.

The method comprises providing a first sheet of material comprising a first layer and a second layer and cutting a form of the first sheet of material. The first sheet of material is cut using a cutter that can punch out a given specific shape of the first element from the first sheet of material.

Optionally, the method comprises scoring the first layer of the first element, wherein scores are covered by the second layer of the first element, and the first element is to be folded along said scores Optionally, the method further comprises processing the second element to provide bevelled groove lines along connecting edges of the at least three pivotably connected parts, wherein the bevelled groove lines enable fitting of the at least three pivotably connected parts when folded.

Optionally, the second element, when folded, forms sides of the foldable box and the method comprises adhesively attaching a base element to the sides of the foldable box.

Optionally, the method comprises providing printed information on a first surface of the first layer of the first sheet of material.

DETAILED DESCRIPTION OF THE DRAWINGS

Figure 1B:
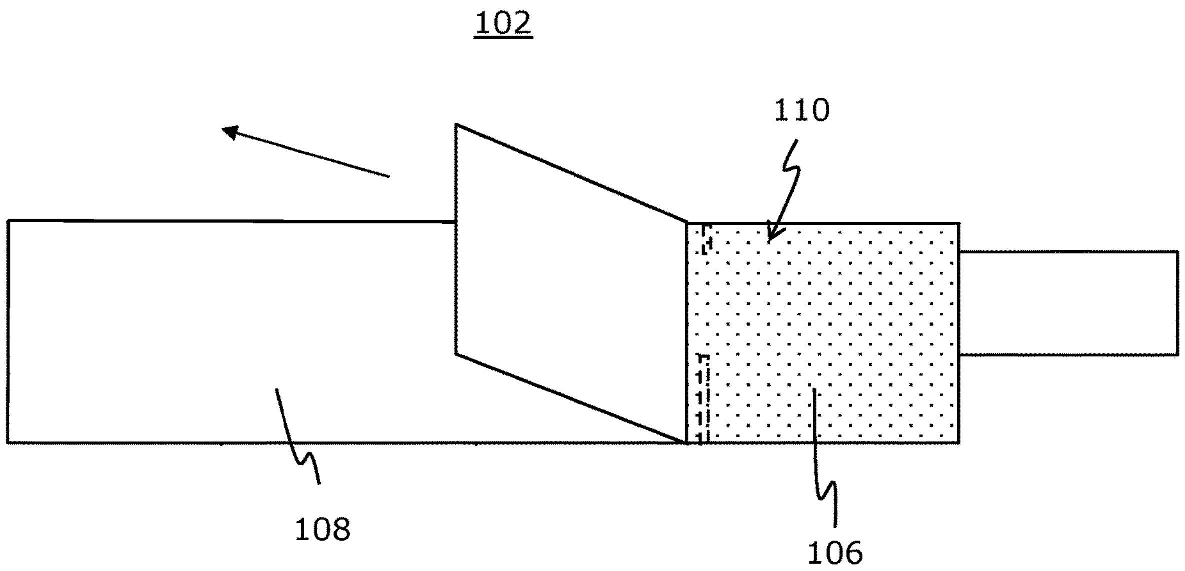
Figure 1C:
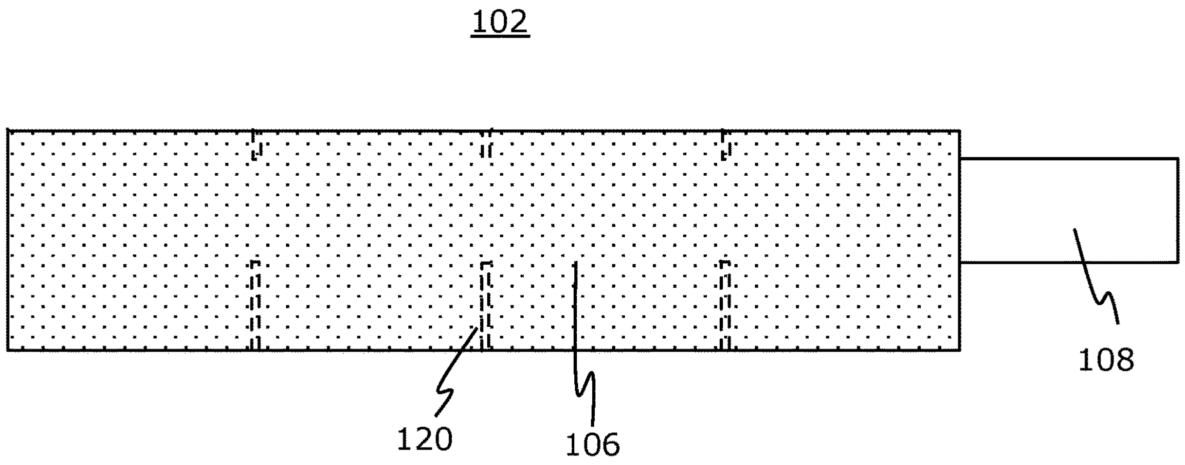
FIGS. 1C, 1D, 1E, 1F and 1G collectively illustrate another embodiment of the present disclosure.
Figure 1D:
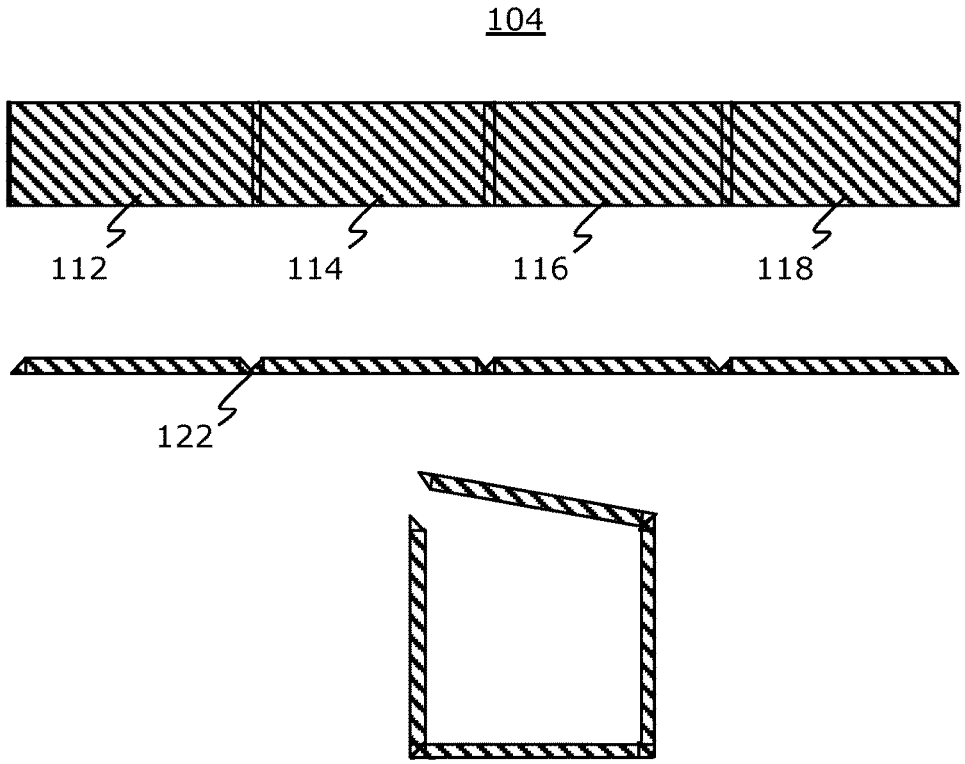

Referring to FIGS. 1A, 1B, 1C, 1D, 1E, 1F and 1G, there is collectively illustrated a foldable box comprising a first element and a second element, in accordance with an embodiment of the present disclosure. In FIG. 1A and FIG. 1B there is shown a top view of the first element 102. The first element 102 comprises a stack of a first layer 106 and a second layer 108. The first layer 106 has a first surface and a second surface opposite to the first surface, the second surface having an adhesive coating (shown using dotted hatch pattern). The second layer 108 is arranged to partially cover the second surface. In addition, the second layer 108 has an opening 110 to partially expose the adhesive coating of the first layer 106. In FIG. 1A the first layer is covered by the second layer. In FIGS. 1B and 1C, the second layer is partially removed from the first layer to expose the adhesive coating of the first layer. In FIG. 1D, there is shown a top view, a side view of the second element 104 and a side view of the folded second element 104. The second element 104 comprises at least three pivotably connected parts, herein four pivotably connected parts, such as the pivotably connected parts 112, 114, 116, 118. Herein, each of the at least three pivotably connected parts, such as 112, 114, 116 and 118, is arranged to be in contact with the exposed part of the adhesive coating of the first layer 106. The first element 102 further comprises scores 120 (shown using dashed line in FIG. 1C) that are covered by the second layer 108. Moreover, the second element 104 comprises bevelled groove lines 122 along the edges, as illustrated in FIG. 1D. Optionally, the first element may also comprise bevelled groove lines or cutting lines. Along the groove lines or cutting lines, the material is easier to wrap/fold in the desired direction, and when folded, the appearance is more appealing.

Figure 1E:
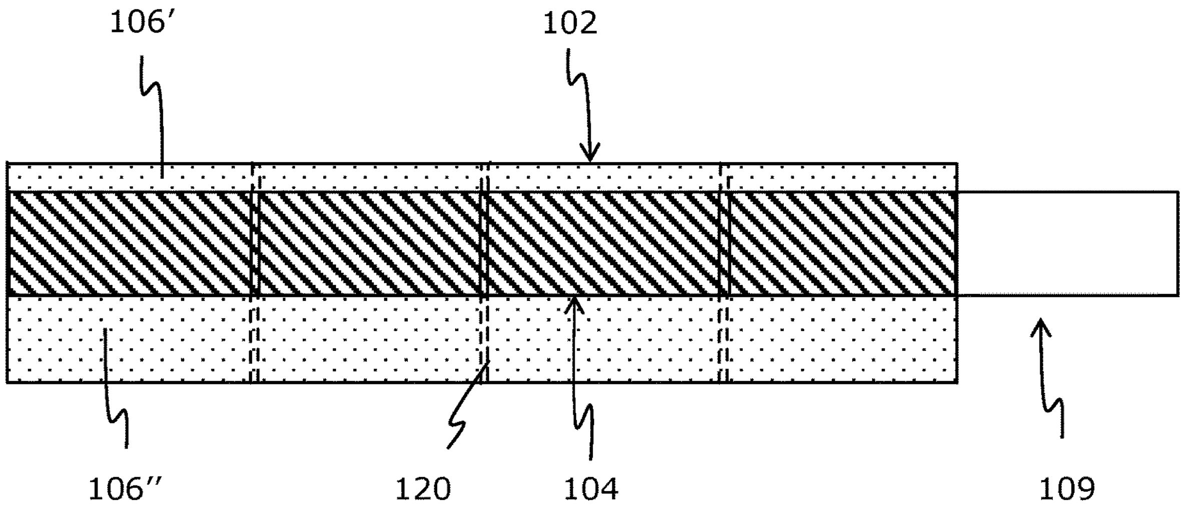
Figure 1F:
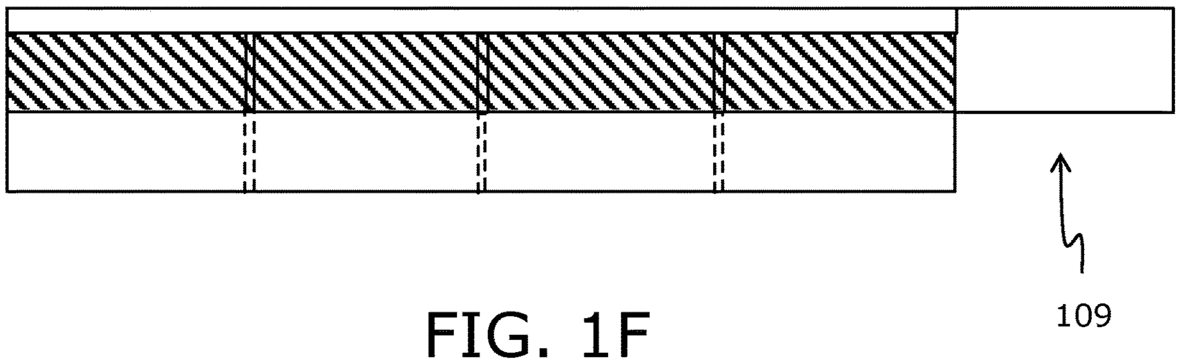
Figure 1G:
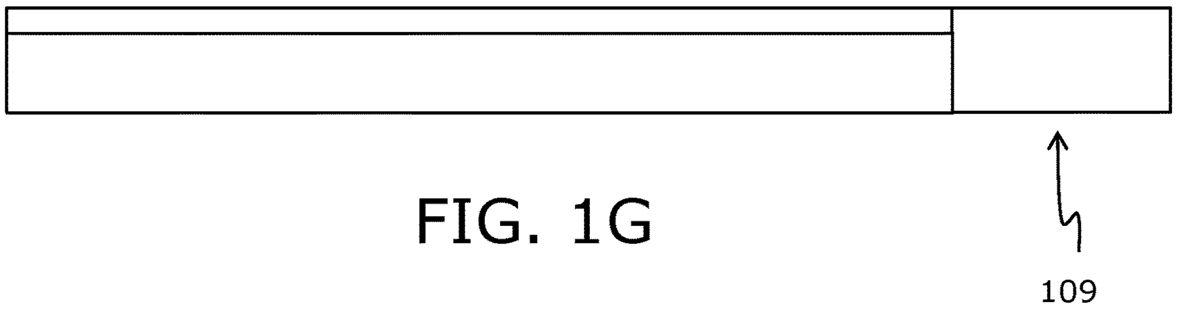

Referring to FIGS. 1E, 1F and 1G, there is collectively illustrated another embodiment of the present disclosure in which a first element 102 having a polygonal shape with an adhesive coating (in the dotted area) is wrapped around the second element 104 such that the first element 102 almost completely covers the second element 104. In this embodiment, the portions of the first element extend to opposite sides of the second element. The first element 102 has further an excess portion 109, as shown in FIGS. 1E, 1F and 1G, which excess portion may also comprise an adhesive coating on its surface which can be further used to attach the box by gluing. The excess portion 109 is advantageously dimensioned in shape and size to be in equal to the shape and size of the adjacent pivotably connected part of the second element 104 to cover outer side of the pivotably connected part throughout. In FIGS. 1E, 1D and 1F, the second element 104 is first positioned to the first element 102 and after that the portions of the first element 102, which are below and above the second element, are folded/wrapped around the second element 104. The method is explained in the following.

In FIG. 1E, the second layer has been first partially peeled from the first element 102 to expose the adhesive second surface (shown using dotted hatch pattern). The second element 104 is then positioned on top of the first element 102 such that there is a short portion 106' of the first element above the second element and a long portion 106" of the first element below the second element. Next, in FIG. 1F, the short portion 106' is wrapped over the second element so that the adhesive surface of the short element attaches to the second element. After that, in FIG. 1G, the long portion 106" is wrapped over the second element so that the adhesive surface of the short element attaches to the second element, whereby, after wrapping both portions 116', 116", the first element covers opposite sides of the second element. After second element is wrapped as described above the excess portion 109 is still covered by the second layer, as shown in FIG. 1G.

Figure 2A:
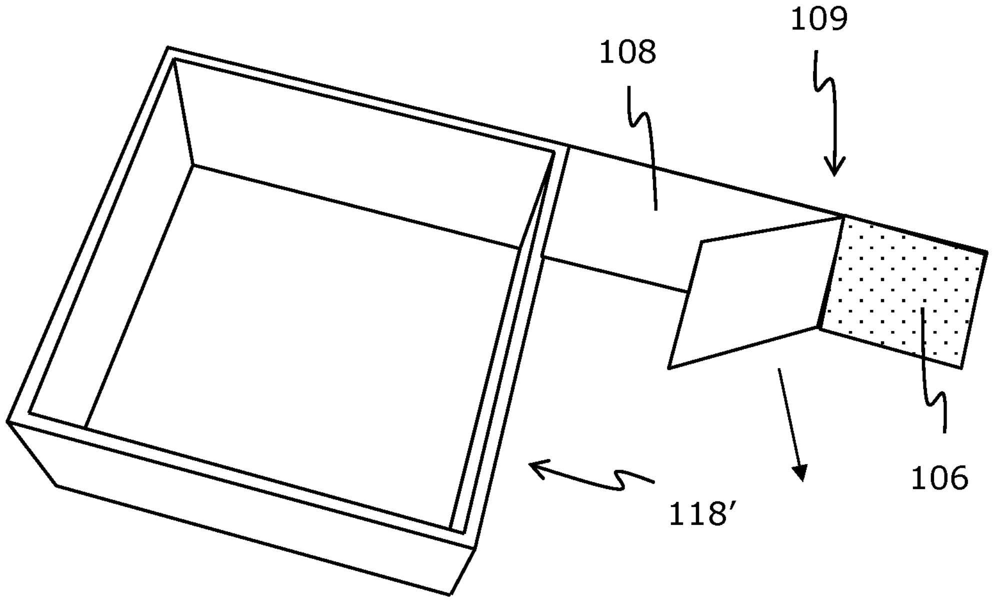
FIGS. 2A and 2B collectively illustrate folding of the foldable box of FIGS. 1A and 1B, in accordance with an embodiment of the present disclosure.
Figure 2B:
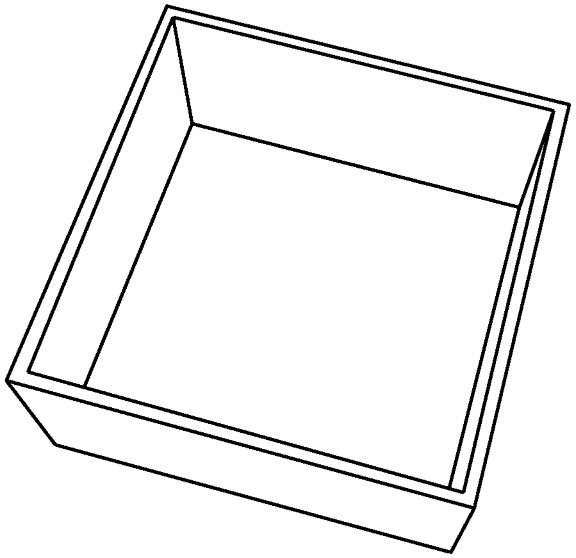

Referring to FIGS. 2A and 2B, there is collectively illustrated the folding of a foldable box of FIGS. 1A-1G, in accordance with an embodiment of the present disclosure. In FIG. 2A, the pivotably connected parts are folded along the bevelled groove lines in such a way that the adjacent pivotably connected parts comes in contact with each other. In FIG. 2A, the pivotable connected parts have been folded so that the angle between the adjacent pivotably connected parts is 90 degrees. Lastly, after folding, the second layer 108 is peeled from the excess portion 109, and the excess portion, its first layer 106 with adhesive coating, is folded inwards along the scores to form the sides of the box and attach the sides of the foldable box to each other. The sides folded and attached to each other as described above is illustrated in FIG. 2B. The excess portion 109 is preferably dimensioned to correspond in size and shape to the size and shape of the adjacent pivotably connected part 118', such that it covers the surface of the part 118' throughout with an equally thick layer and forms an outermost layer on it. An advantage is that the outer surface of the pivotably connected part is even throughout and thus looks aesthetically pleasing.

Figure 3A:
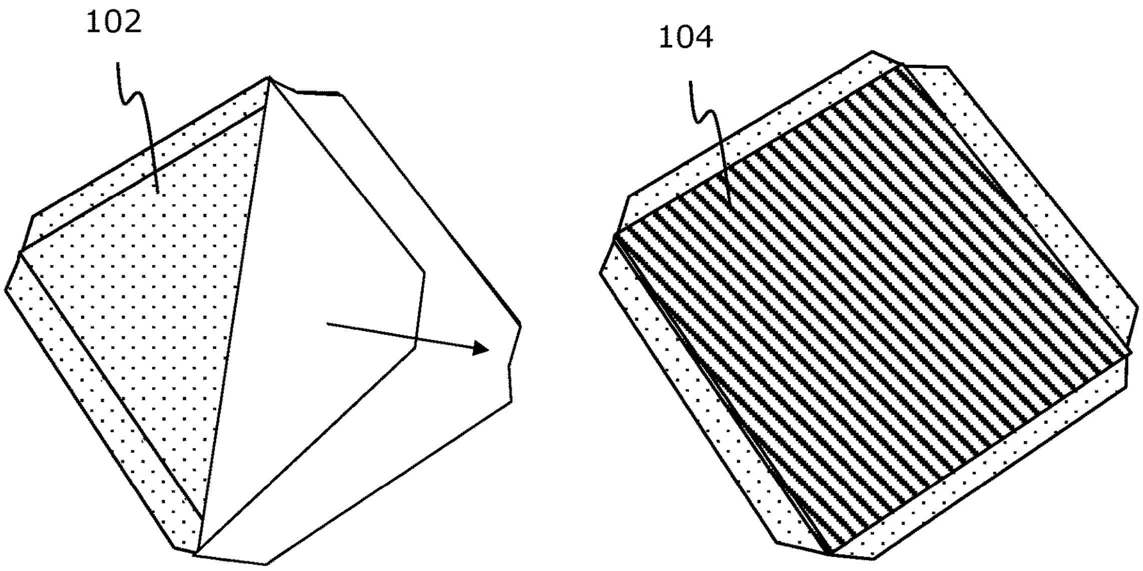
FIGS. 3A and 3B illustrates a method of manufacturing a base element for a foldable box.
Figure 3B:
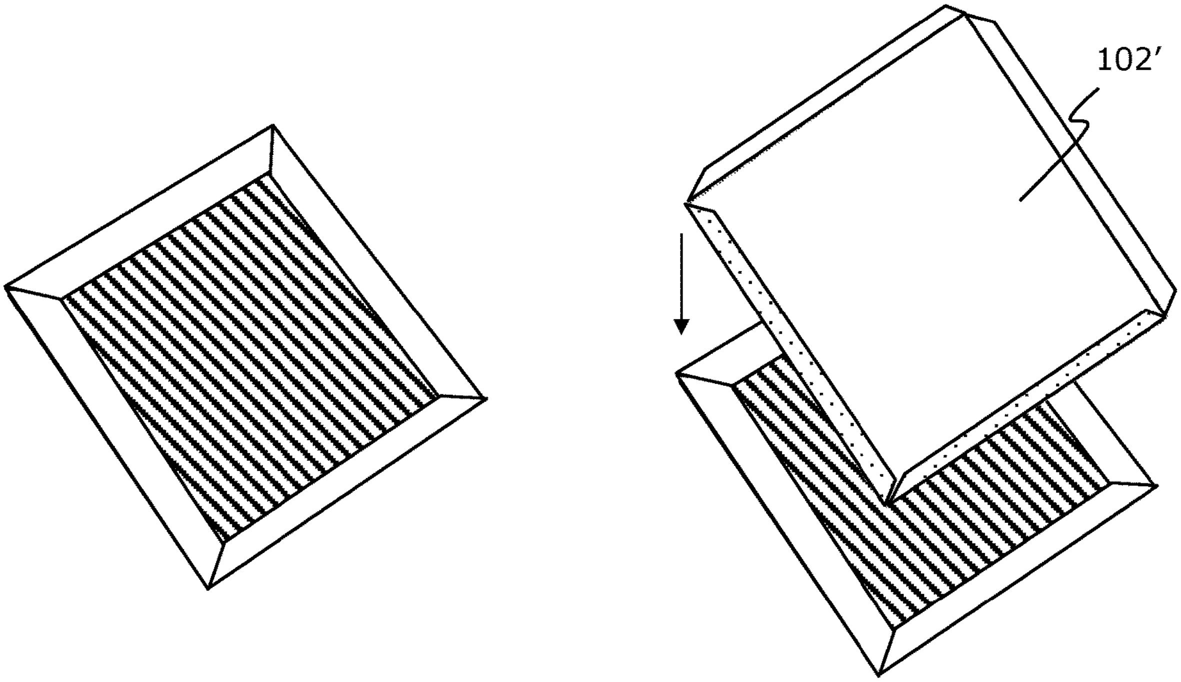
Figure 4:
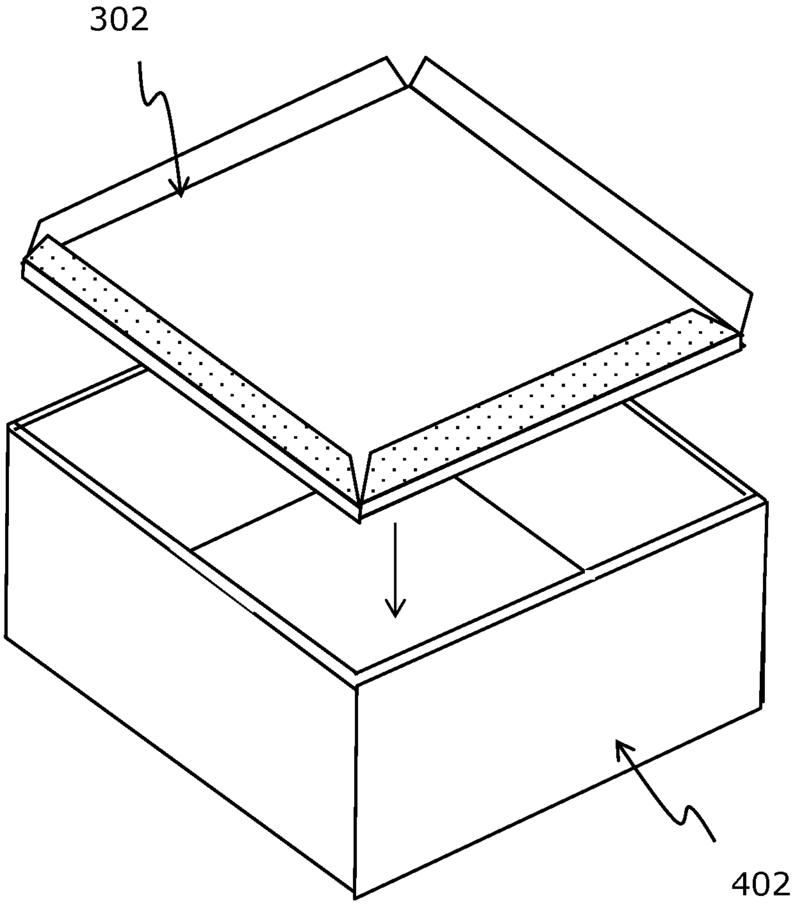
FIG. 4 illustrates a base element in accordance with an embodiment of the present disclosure.

Referring to FIGS. 3A and 3B, illustrated is a method of manufacturing a base element for a foldable box. A top view of the base element 302 for a foldable box 402, in accordance with an embodiment of the present disclosure is illustrated in FIG. 4. The base element 302 is formed by attaching a separate base shaped second element 104 to the opening of an adhesive surface of a separate first element 102. Further, the base element 302 is adhesively attached to the sides of the box, as show in FIG. 4. Additionally, another separate first element 102' is placed on top of the second element so that the second element is between two first elements. First, in FIG. 3A, a second layer from the first element 102 is removed. Then, the second element 104 is positioned to the exposed adhesive surface of the first layer to attach the second element to the first element (as shown on the right side in FIG. 3A). Next, the portions of the first element surrounding the second element are folded around the second element and attached to the second element. This is illustrated on the left side in FIG. 3B. Lastly, another separate first element 102' is placed on top of the second element so that the second element is between the first elements 102 and 102'. The base element is then ready as illustrated in FIG. 4.

Figure 5A:
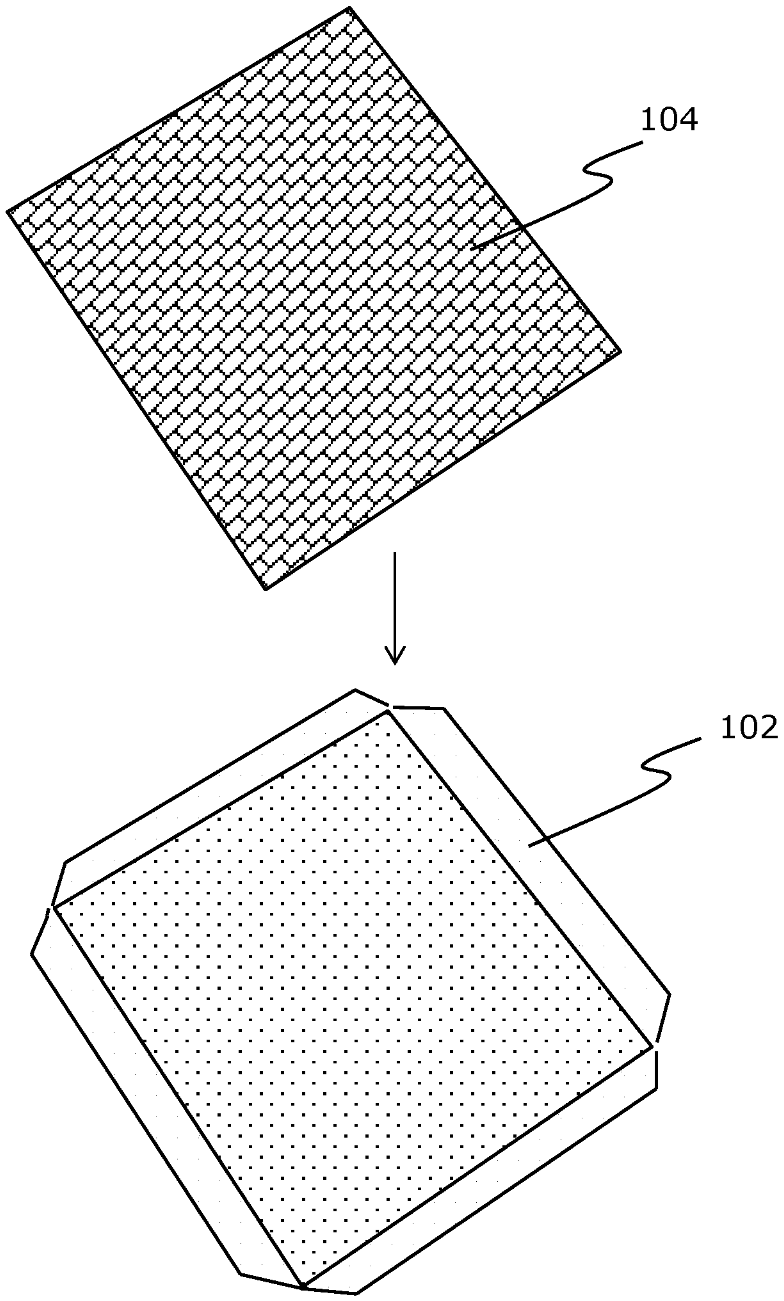
FIGS. 5A, 5B and 5C collectively illustrate a method of manufacturing a base element for a foldable box in accordance with another embodiment of the present disclosure.
Figure 5B:
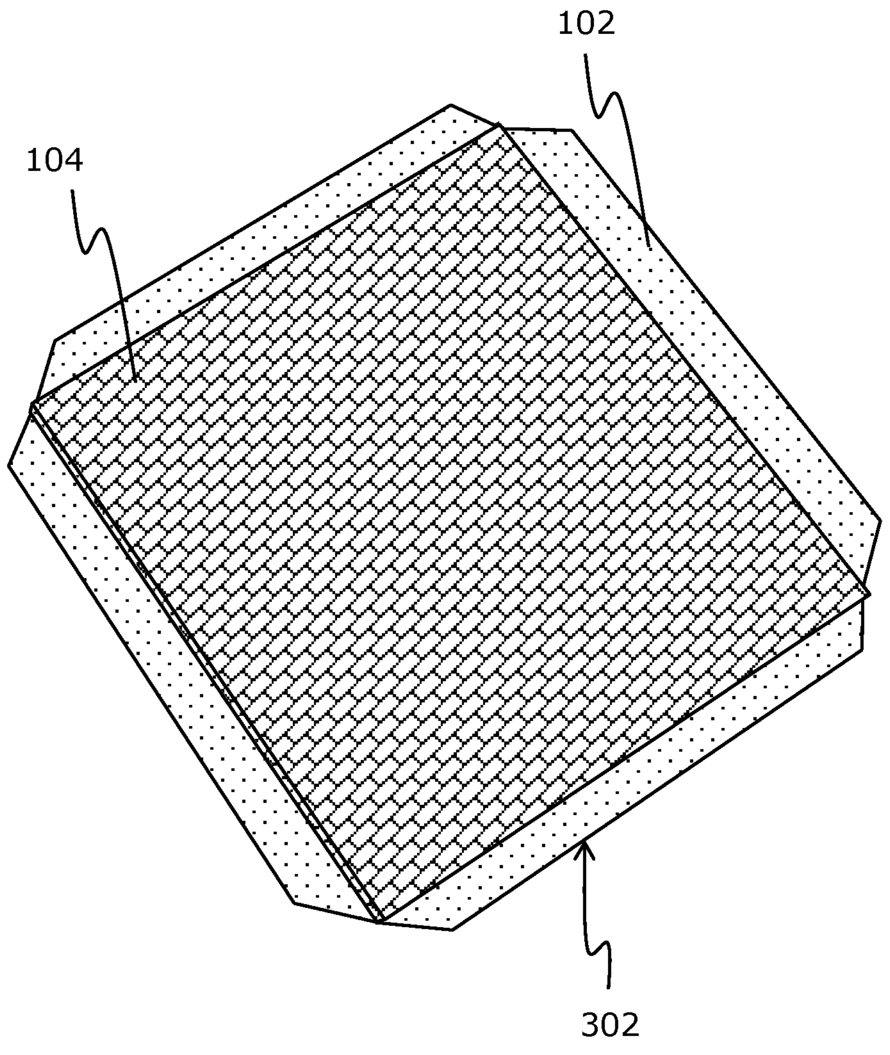
Figure 5C:
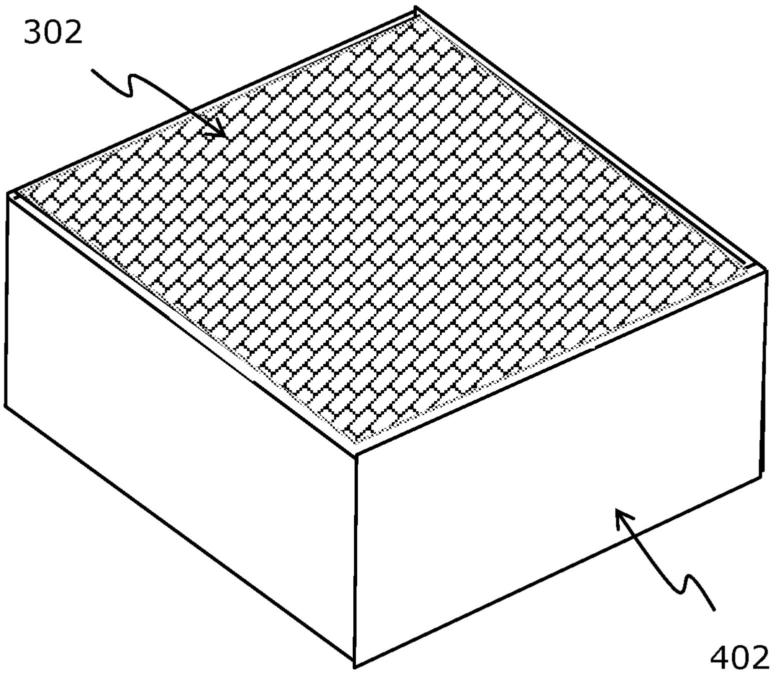

Referring to FIGS. 5A, 5B and 5C, illustrated is a method of manufacturing a base element for a foldable box in accordance with another embodiment of the present disclosure. In this embodiment the base element 302 may include any other suitable material, for example, wood. The base element may be, for example, one of: a piece of board, cardboard, paper, wood veneer, wood imitation, plywood, leather, glass, fiberglass, graphite, plastic, rubber, stone. The base element 302 is formed in a similar way as described above. First, the second layer is peeled from the first element to expose the adhesive surface of the first element 102. Next, a separate base shaped second element 104, which is made of wood, for example, is attached to the opening of an adhesive surface of a separate first element 102, as illustrated in FIGS. 5A and 5B. The base element is then ready. Further, the base element 302 is adhesively attached to the sides of the box, as illustrated in FIG. 5C.

Figure 6A:
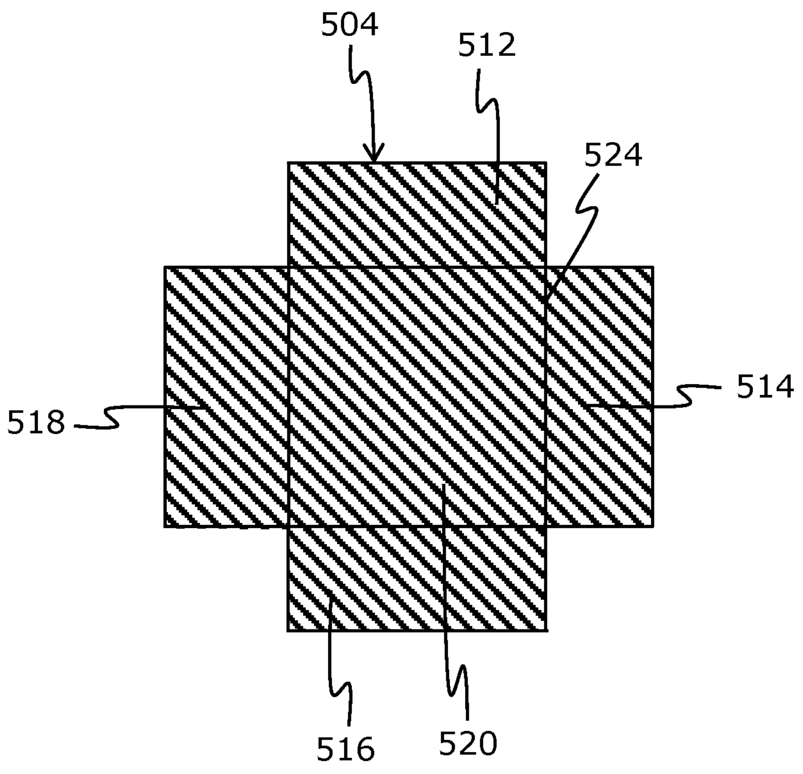
FIGS. 6A and 6B collectively illustrate a foldable box in accordance with an embodiment of the present disclosure.
Figure 6B:
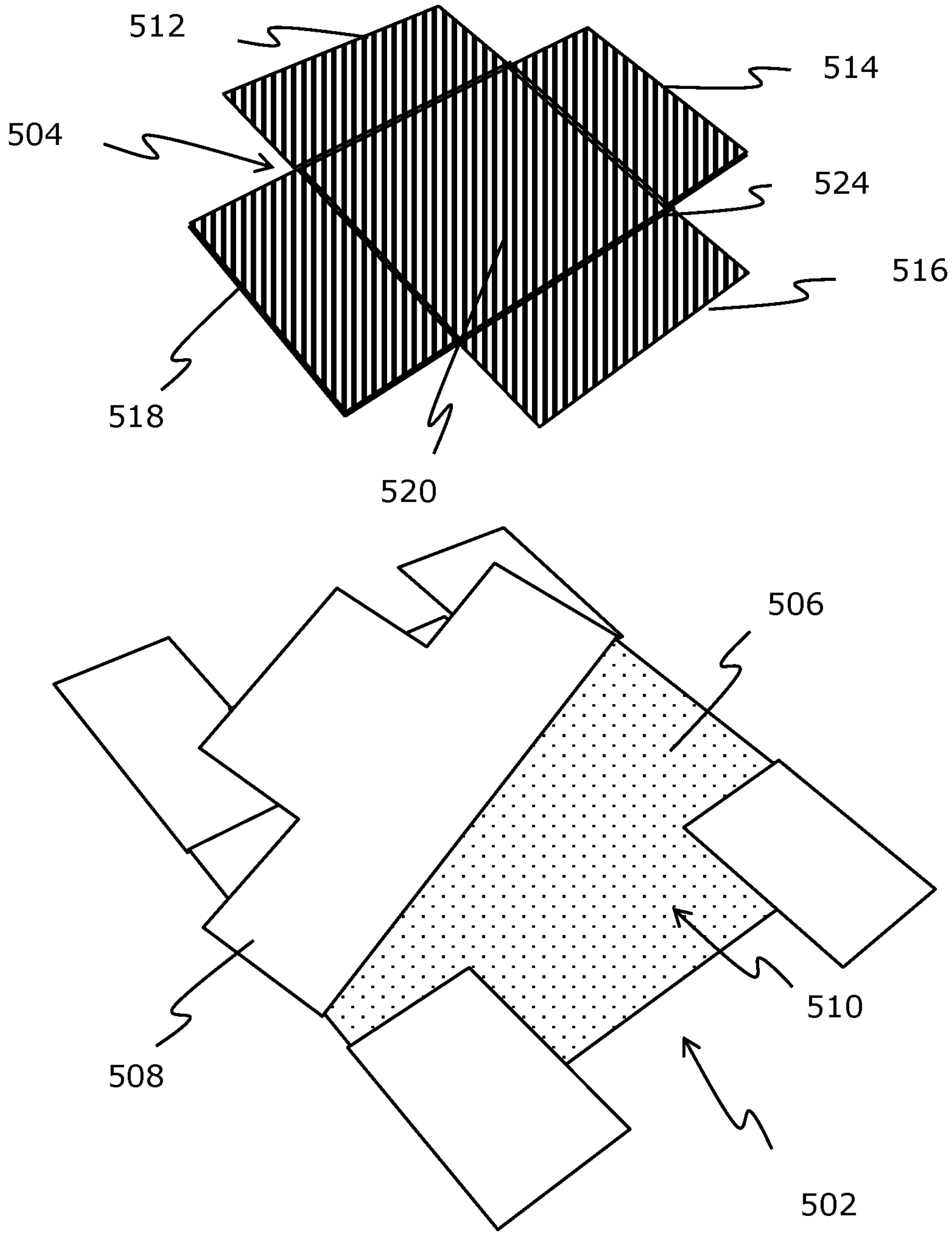

Referring to FIGS. 6A and 6B, there is collectively illustrated a foldable box comprising a first element 502 and a second element 504, in accordance with another embodiment of the present disclosure. In FIG. 5B, there is shown a top view of the first element 502 comprising a stack of a first layer 506 and a second layer 508. The first layer 506 has a first surface and a second surface opposite to the first surface, the second surface having an adhesive coating (shown using the dotted hatch pattern). The second layer 508 is arranged to partially cover the second surface, the second layer 508 having an opening 510 to partially expose the adhesive coating of the first layer 506. Further, in FIGS. 6A and 6B, there is shown a top view of the second element 504 comprising at least three pivotably connected parts, such as the pivotably connected parts 512, 514, 516, 518 and a base part 520. Herein, the base part 520 is arranged to be in contact with the exposed part of the adhesive coating of the first layer 506. The first element 502 further comprises scores (not shown) that are covered by the second layer 508. Moreover, the second element 504 comprise bevelled groove lines 524 along the edges. Optionally, the first element 502 also comprises bevelled groove lines.

Figure 7A:
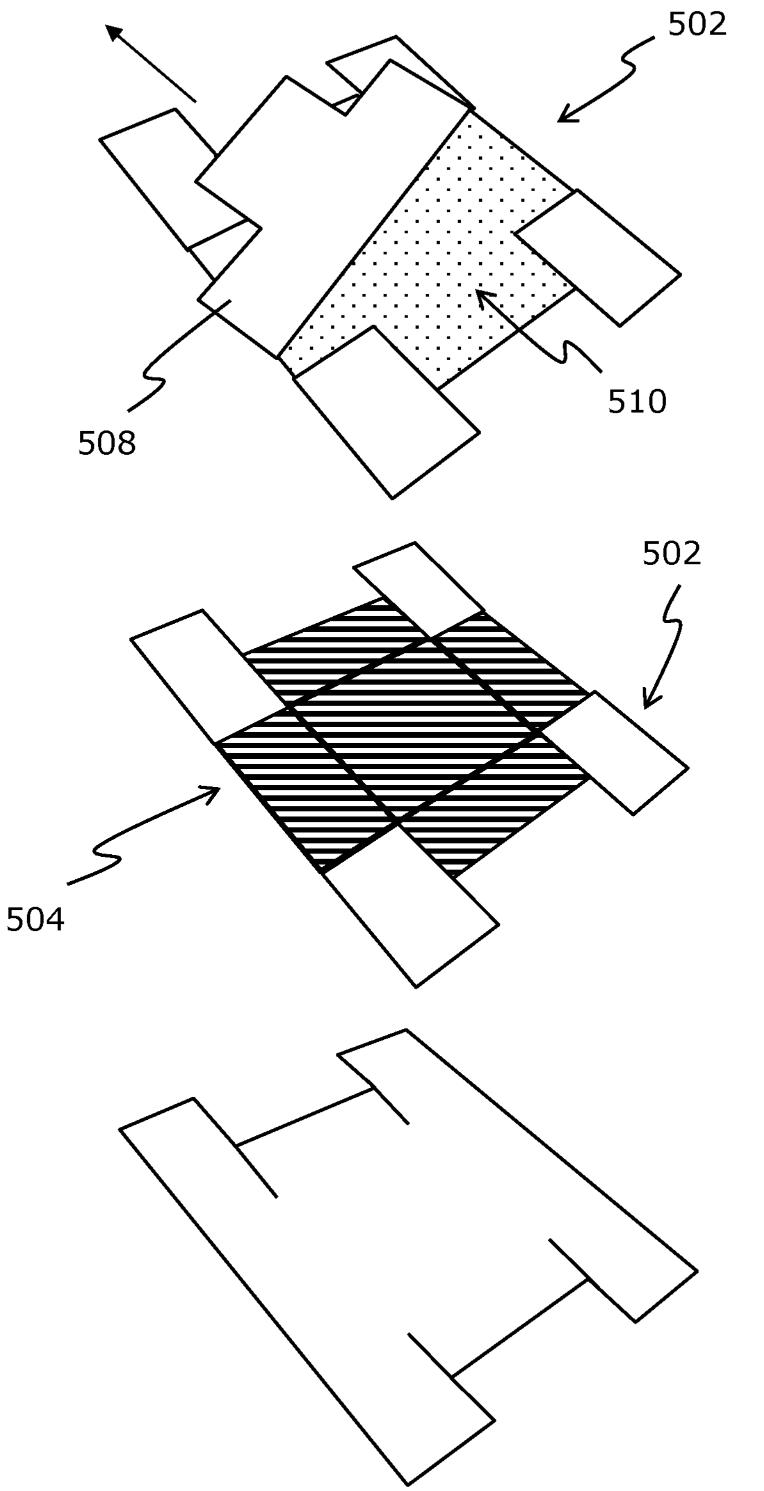
FIGS. 7A and 7B collectively illustrate folding of a foldable box of FIGS. 6A and 6B, in accordance with an embodiment of the present disclosure.
Figure 7B:
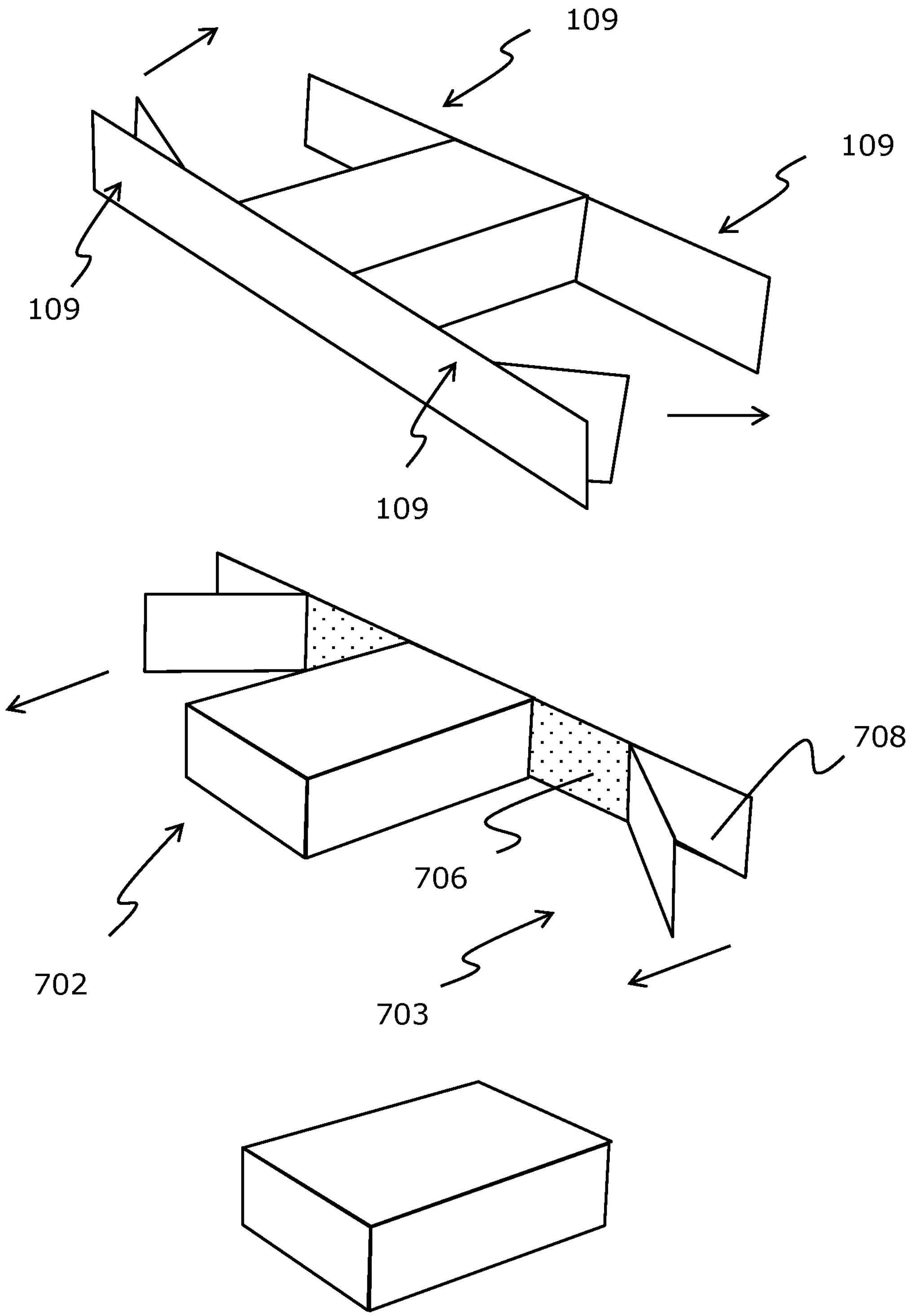

Referring to FIGS. 7A and 7B, there is collectively illustrated folding of a foldable box of FIGS. 6A and 6B, in accordance with an embodiment of the present disclosure. In FIG. 7A, first, in the uppermost figure, the second layer is peeled from the first layer to expose the adhesive surface of the first element. Next, in the middle figure, the second element 504 is attached to the exposed opening 510 of the first element 502. Herein, the each pivotably connected parts, such as 512, 514, 516, 518 and base part 520 are attached to the opening 510 of the first element 502. Next, in FIG. 7A, in the lowermost figure, after attaching, the installation of the first element and second element is turned 180 degrees, i.e., upside down, and placed on a jig. This can also be done without a jig. In FIG. 7B, the at least three pivotably connected parts, such as 512, 514, 516, 518 are folded along the bevelled groove line 524. Herein, the pivotably connected parts are folded 90 degrees to form a box like structure, as shown in the uppermost figure of FIG. 7B. Once folded, the excess portions 109 in opposite sides of the foldable box are then extending in a direction away from the sides of the foldable box. Next, the second layers are peeled from each of the excess portions 109. The first set of excess portions 109, on one side of the foldable box, are first folded inwards and then attached to the adjacent sides of the foldable box as shown in the upper drawing of FIG. 7B. Then, a second set of excess portions 109, on opposite side of the foldable box, are folded inwards and then attached to the adjacent sides of the foldable box as shown in the middle drawing of FIG. 7B. The foldable box is then ready as shown in lowermost figure, in FIG. 7B.

Figure 7C:
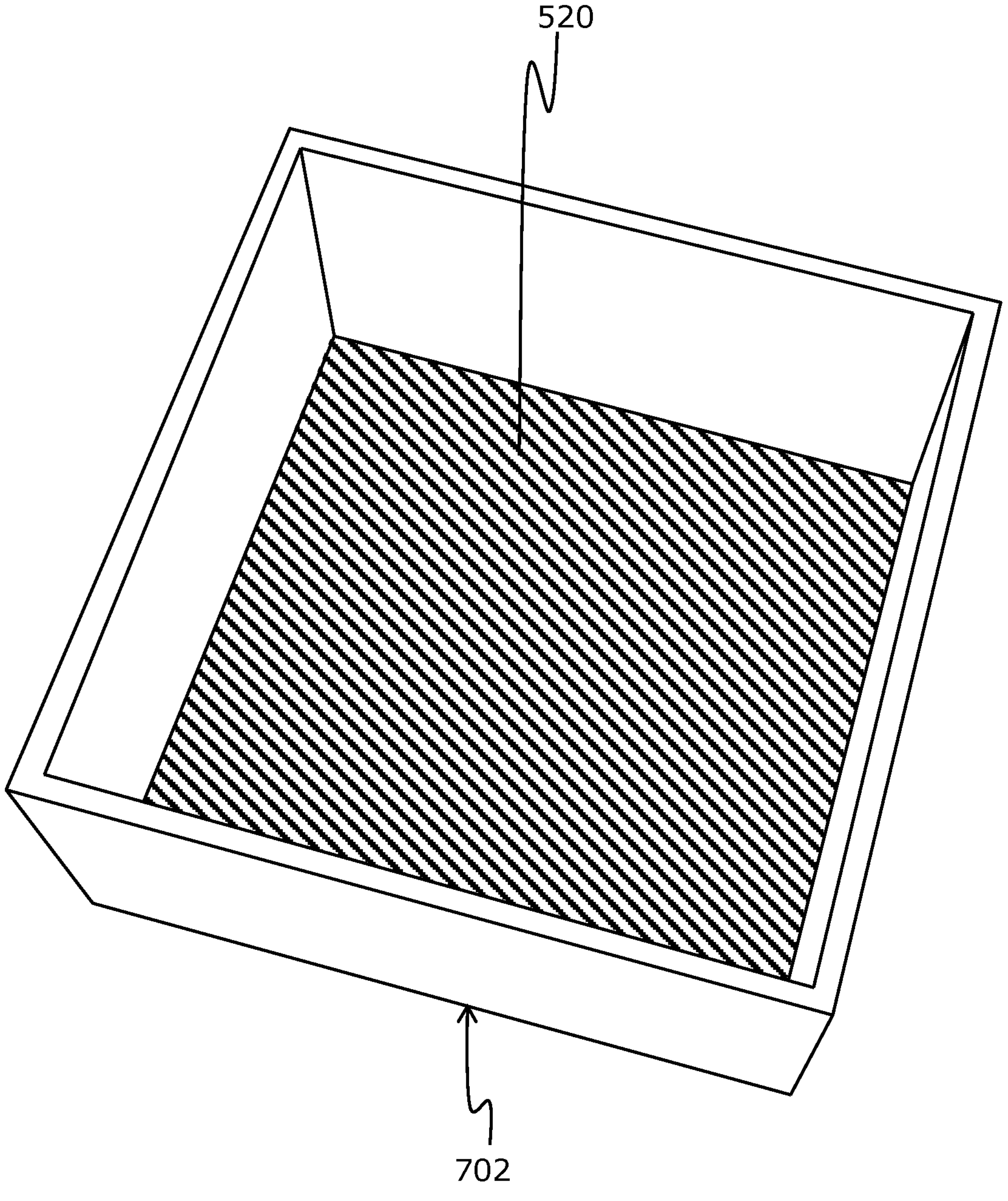
FIG. 7C illustrates a box folded from the foldable box as illustrated in FIGS. 6A and 6B, in accordance with an embodiment of the present disclosure.

Referring to FIG. 7C, illustrated is a box 702 folded from the foldable box as illustrated in FIGS. 6A and 6B, in accordance with an embodiment of the present disclosure. The base element 520 and the sides collectively form the folded box 702.

Figure 8:
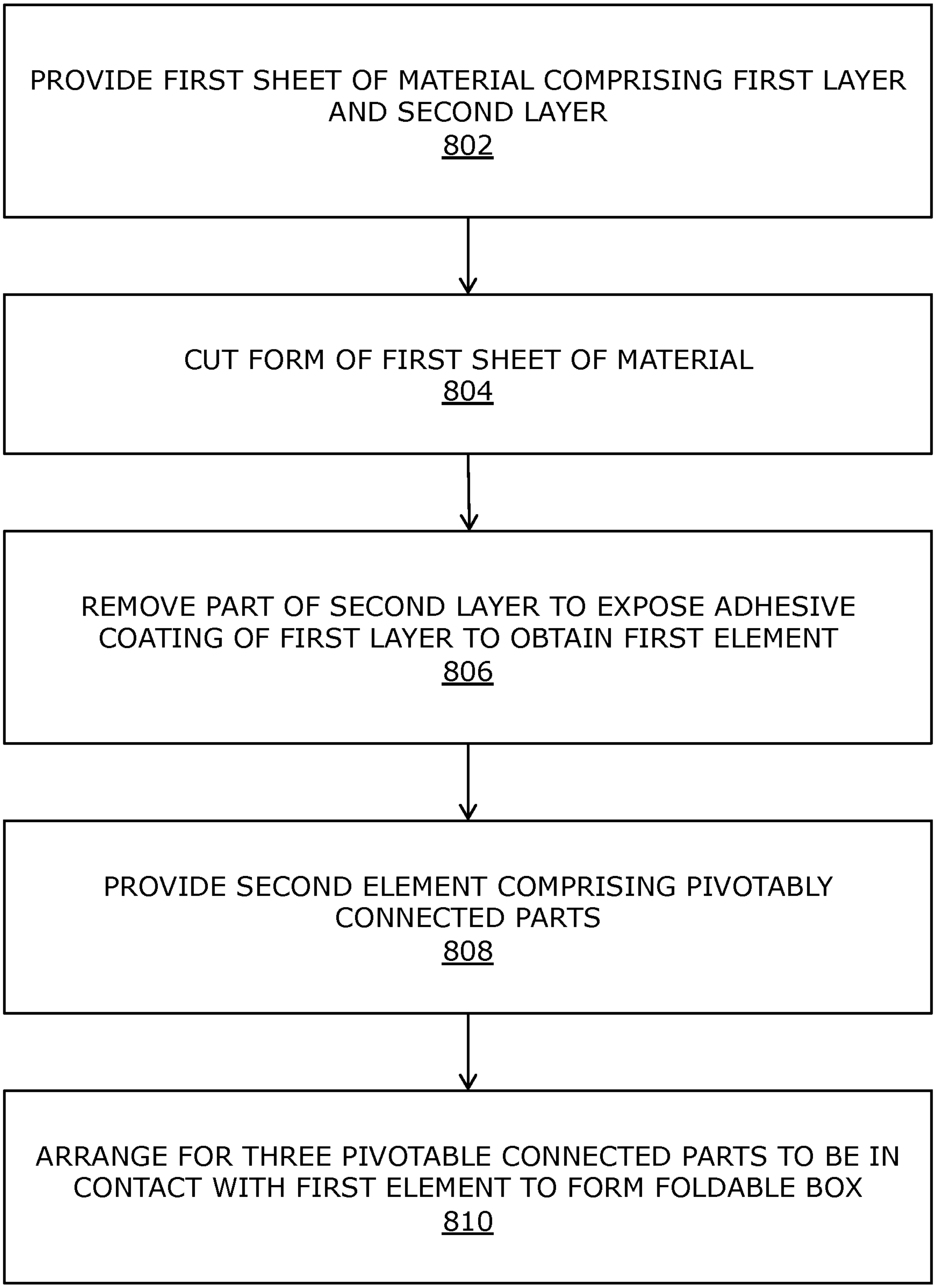
FIG. 8 is a flowchart depicting steps of a method for manufacturing a foldable box, in accordance with an embodiment of the present disclosure.

Referring to FIG. 8, illustrated is a flowchart depicting steps of a method for manufacturing a foldable box, in accordance with an embodiment of the present disclosure. At step 802, a first sheet of material comprising a first layer and a second layer is provided. The first layer has a first surface and a second surface opposite to the first surface. The second surface has an adhesive coating, and the second layer covers the adhesive coating on the second surface. At step 804, a form of the first sheet of material is cut. At step 806, a part of the second layer is removed to expose the adhesive coating of the first layer to obtain a second element. At step 808, a second element comprising at least three pivotably connected parts is provided. At step 810, arranging for each of the at least three pivotably connected parts to be in contact with the exposed adhesive coating of the first element to form the foldable box.

Figure 9:
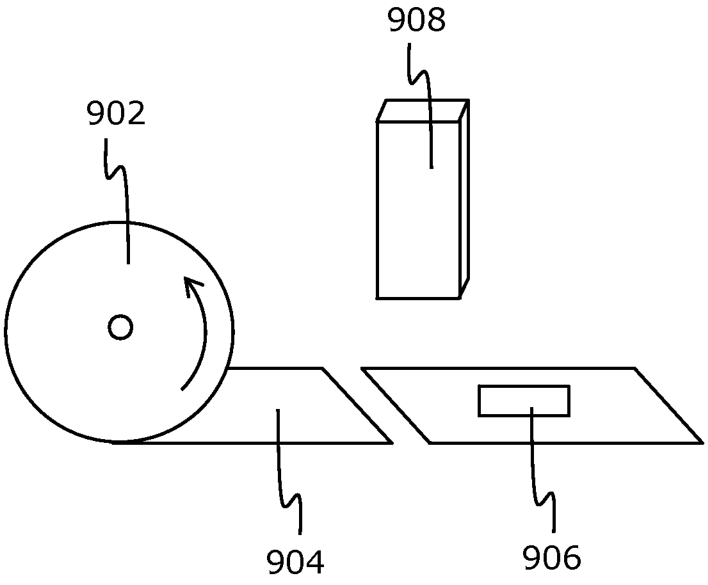
FIG. 9 illustrates an overview of manufacturing steps of the foldable box in accordance with an embodiment of the present disclosure.

Referring to FIG. 9, illustrated is an overview of manufacturing the foldable box, in accordance with an embodiment of the present disclosure. A roller 902 provides a first sheet of material 904. The cutter 908 cuts a form 906 from the first sheet of material. Thereafter, a part of the second layer is removed from the first sheet of material to expose the adhesive coating of the first layer to obtain a second element.

Figure 10:
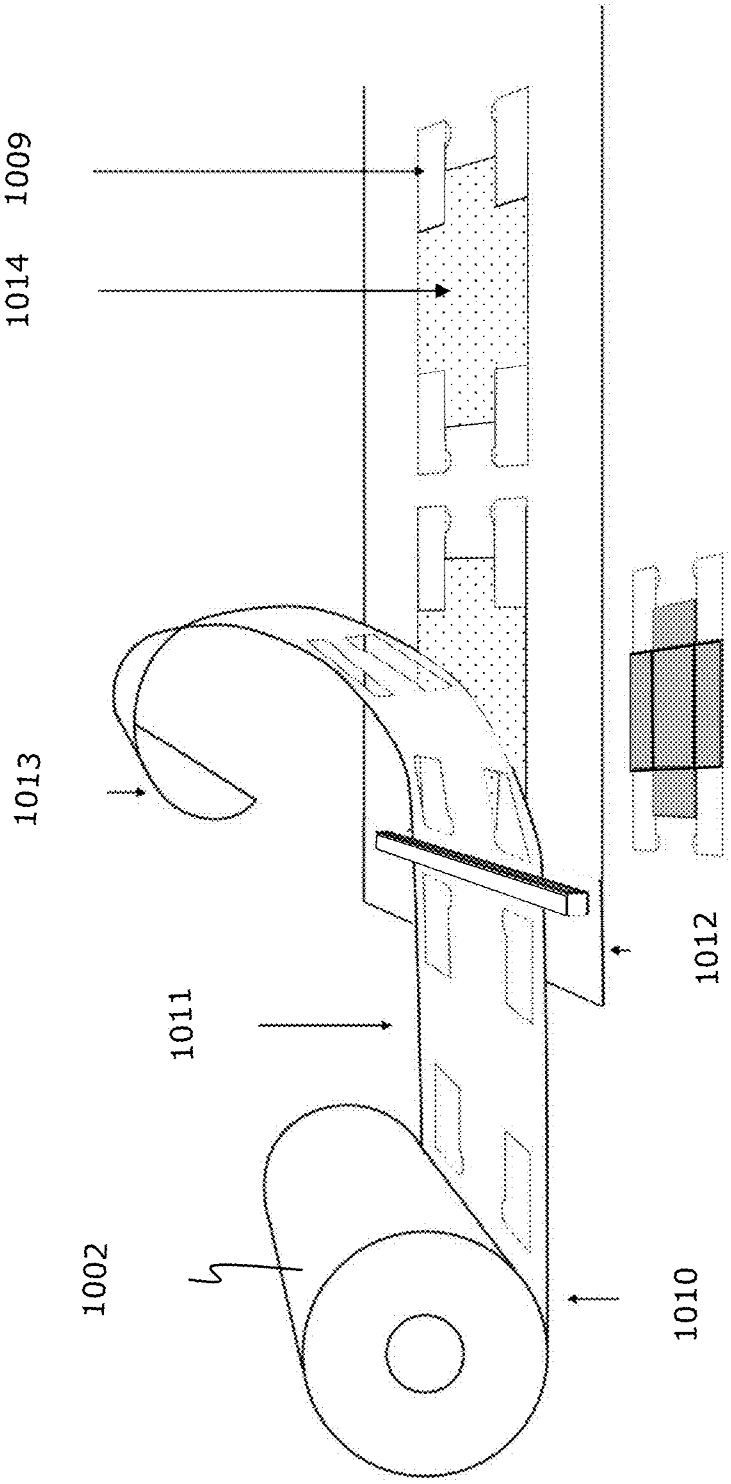
FIG. 10 illustrates manufacturing steps of the foldable box in accordance with an embodiment of the present disclosure.

The first sheet of material may be provided with separate die cuts to create custom shapes and designs for first sheet of material. The first sheet of material may comprise separate die cuts for each second element, and separate die cuts for each excess portion around the center second element, in the first sheet of material. The die cuts are thus preferably designed and made according to the shape and size of the second element and the shape and size of the excess portions arranged in the first sheet of material. The dimensions and shapes of the die cuts may correspond, for example, to sizes and shapes of a cross-shaped areas at the center portion of the first sheet of material, as illustrated dotted areas in FIG. 10, and the sizes and shapes of the rectangular shaped excess portion areas around the center portions, as illustrated in FIG. 10. The die cuts for the different portions can be made on the first sheet of material in at least two ways in advance or during a separate step in the manufacturing process. Die cutting may be a separate or integral part of fabrication process that uses specialized machines and tools to shape materials.

Referring to FIG. 10, illustrated is a manufacturing process of the foldable box, in accordance with an embodiment of the present disclosure. At step 1010, there is provided a first sheet of material having a width which is greater than the width of the second element, which first sheet is fed from a roller 1002. The first sheet of material is arranged in a such way that the print side is directed below the first sheet of material. At step 1011, the first sheet of material is die cut to form a desired shape and design of the first sheet of material. Optionally, the first sheet of material is prefabricated, and/or die cut is provided therein beforehand. At 1012, the die cut first sheet of material is fed to the vacuum table (the print side of the first sheet of material is directed towards the vacuum table). At 1013 a carrier tape (herein, in FIG. 10, and in FIGS. 11-12, the carrier tape may be referred as the second layer of the first element, and the underlying layer below it as the first layer of the first element) is removed from the first sheet of material to expose the adhesive surfaces from the center portions 1014 (marked as dotted area) and the surrounding portions of the first sheet of material to form a first element. Herein, the excess portions 1009 at the corners of the center portions 1014 remain unexposed. Next, a second element may be placed on the center portion of the first element formed, either automatically, by machinery, or manually. The second element placed on the center portion of the first element is shown in the lower drawing of FIG. 10.

Figure 11:
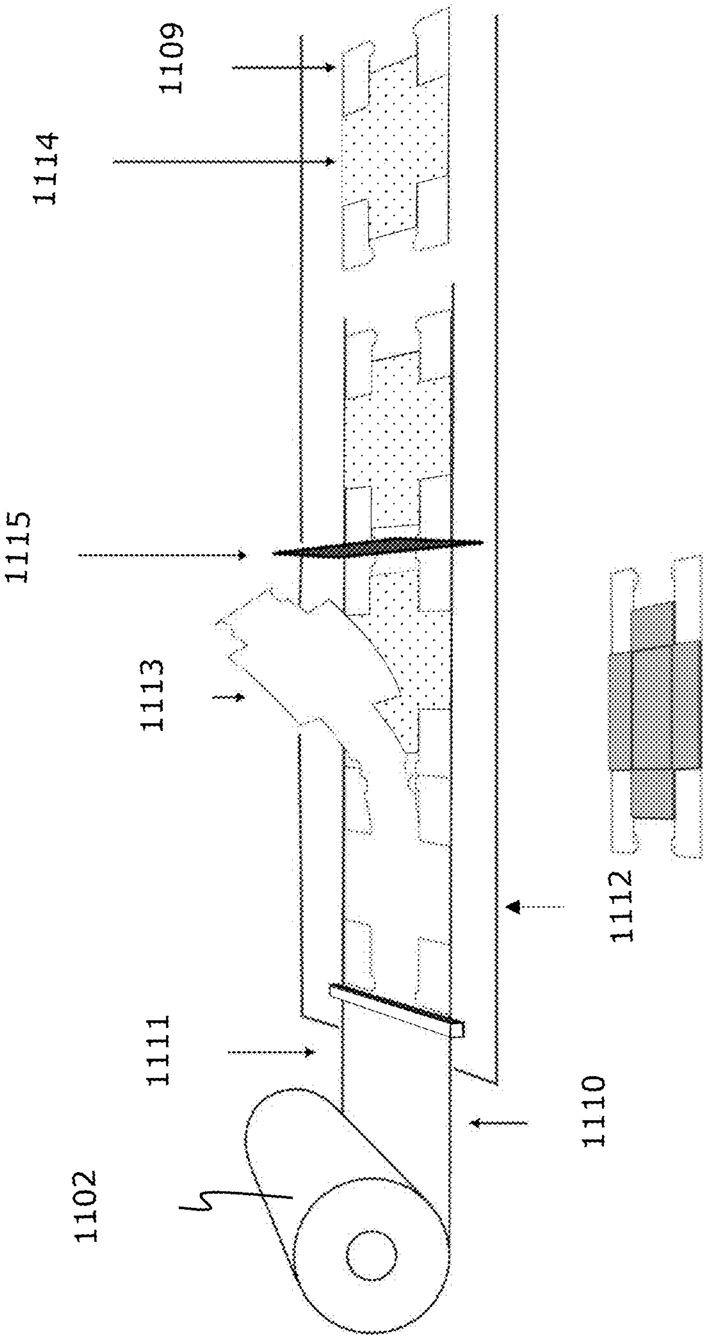
FIG. 11 illustrates manufacturing steps of the foldable box in accordance with another embodiment of the present disclosure.

Referring to FIG. 11, illustrated is a manufacturing process of the foldable box, in accordance with another embodiment of the present disclosure. At 1110 there is provided a first sheet of material coming from the roller 1102. The arrangement and configuration of the first sheet of material is otherwise similar than in the embodiment illustrated in FIG. 10, but, in this embodiment, the first sheet of material is shaped and dimensioned so that the width of the roll is equal to the width of the second element.

The first sheet of material is arranged to extend over the second element in the longitudinal direction, and to be delimited in the width direction of the roll between the outer edges of the second element. At 1111 the first sheet of material is die cut to form the desired shape and design of the first sheet of material. The first sheet of material can be also die cut beforehand. At 1112 the die cut first sheet of material is fed to the vacuum table. At 1115 the first elements are separated from each other by cutting. At 1113 a carrier tape is removed from the center portion of the first sheet of material to expose the adhesive surface and to form a first element. Next, a second element is place on the center portion of the first element formed. The excess portions 1109 at the corners of the center portions 1114 remain unexposed. The second element placed on the center portion of the first element is shown in the lower drawing of FIG. 11.

The advantage of the embodiment, illustrated in FIG. 11, is that the first sheet of material is consumed less than in the embodiment of FIG. 10. In the embodiment of FIG. 10, the carrier tape is removed both the surrounding areas of central and excess portions, while in the embodiment of FIG. 11, the carrier tape only needs to be removed from the center portion. Thus, the material is saved in the embodiment of FIG. 11. Cutting the first element from the first sheet of material is also simpler in the latter embodiment. The cutting can be performed before the carrier tape removal/peeling step, as described above in connection with FIG. 10 and FIG. 11, to separate the first elements from each other. The second element can then be installed on the center portion of the first sheet of material. The second element as installed on the first element is illustrated in the lower drawing of FIG. 11.

Figure 12:
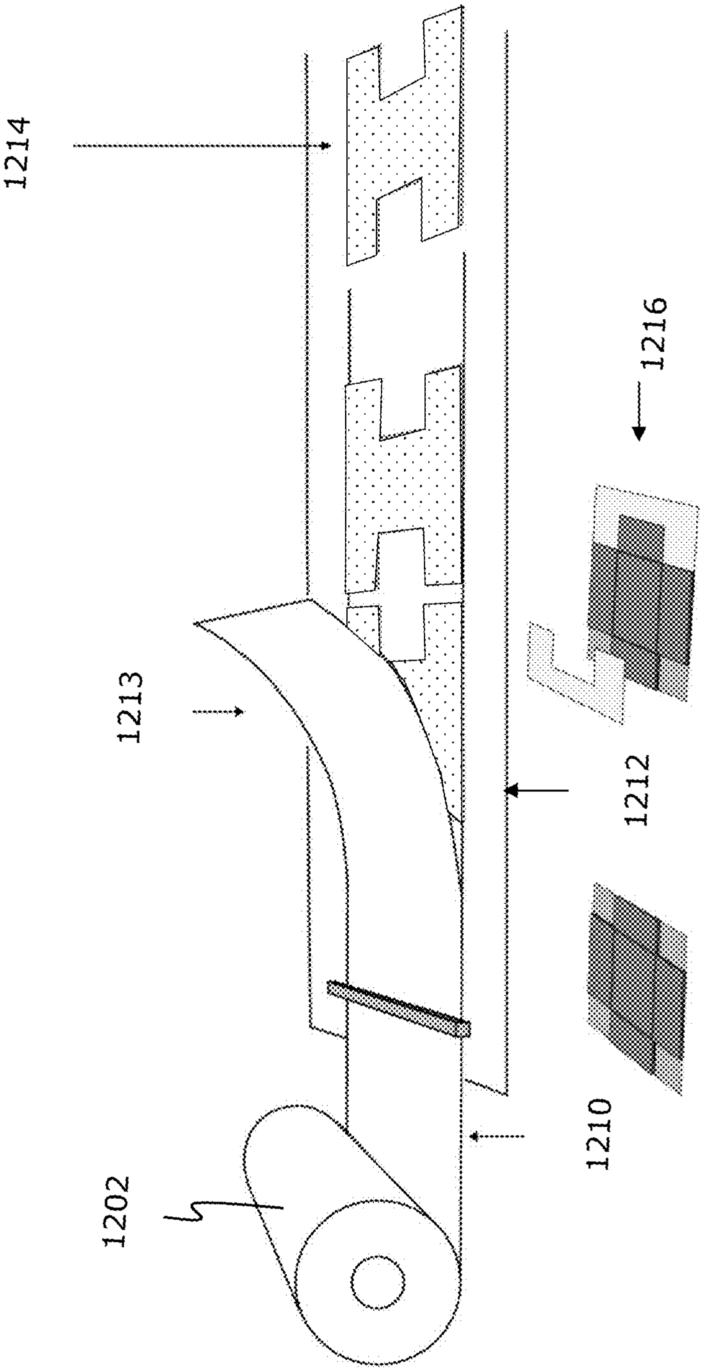
FIG. 12 illustrates manufacturing steps of the foldable box in accordance with yet another embodiment of the present disclosure.

Referring to FIG. 12, illustrated is a manufacturing process of the foldable box, in accordance with yet another embodiment of the present disclosure. At 1210 there is provided a first sheet of material from a roller 1202. At 1212 the first sheet of material is fed to the vacuum table. At 1213 a carrier tape is removed from the first sheet of material to expose the adhesive surface and to form a first element. Additionally, there can be a separate cutting step to separate the first element from each other before the carrier tape removal. Optionally, the cutting is after the carrier tape removal. At 1214 the adhesive surface of the first element is completely exposed, also the adhesive surfaces of the excess portions are exposed. Next, the second element is place on the center portion of the first element formed as illustrated in the lower drawing of the FIG. 12.

The difference between the embodiment illustrated in FIG. 12 and the embodiment illustrated in FIG. 11 is that, in FIG. 12, the carrier tape is completely removed from the first sheet of material. Thus, the removal of the carrier tape reveals both the central portion of the first sheet of material and the surrounding excess portions completely. Whole adhesive area of each first element can therefore be exposed by removal of the carrier tape material, which makes the manufacturing process of the foldable box simpler.

Additionally, after the carrier tape removal, there may be separate carrier tapes 1216 for the exposed parts of the excess portions to cover them, e.g., temporarily, for example, during transportation of the foldable box. These carrier tapes may be placed over the remaining exposed areas of the first element, as illustrated in FIG. 12, illustrating two carrier tapes arranged opposite to each other.

Modifications to embodiments of the present disclosure described in the foregoing are possible without departing from the scope of the present disclosure as defined by the accompanying claims. Expressions such as “including”, “comprising”, “incorporating”, “have”, “is” used to describe and claim the present disclosure are intended to be construed in a non-exclusive manner, namely allowing for items, components or elements not explicitly described also to be present. Reference to the singular is also to be construed to relate to the plural.

The invention claimed is:

1. A foldable box that is a flat structure, when unfolded, and forms a box, when folded, the foldable box comprising a first element and a second element, wherein the first element comprising a stack of a first layer and a second layer, wherein the first layer has a first surface and a second surface opposite to the first surface, the second surface having an adhesive coating, and wherein the second layer is arranged to partially cover the second surface, so that the second layer has an opening to partially expose the adhesive coating of the first layer; and the second element comprising at least three pivotably connected parts, wherein, when the foldable box is folded, the second element is arranged to be in contact with the exposed part of the adhesive coating of the first layer in a manner that each of said pivotably connected parts overlaps with the adhesive coating of the first layer, and the first layer attaches to and covers the outer sides of the second element forming an outer surface of the foldable box, wherein the first element comprises at least one excess portion to attach the foldable box; said excess portion having the shape and size of an adjacent pivotably connected part of the at least three pivotably connected part to cover outer side of said adjacent pivotably connected part throughout.

2. The foldable box of claim 1, wherein the second element comprises bevelled groove lines along connecting edges of the at least three pivotably connected parts, wherein the bevelled groove lines enable fitting of the at least three pivotably connected parts when folded.

3. The foldable box of claim 1, wherein the second element, when folded, forms sides of the foldable box and the foldable box further comprises a base element that is adhesively attachable to the sides of the foldable box and that forms a base thereof.

4. The foldable box of claim 3, wherein the base element is one of: a piece of board, cardboard, wood veneer, wood imitation, plywood, leather, glass, fiberglass, graphite, plastic, rubber, stone.

5. The foldable box of claim 1, wherein second element further comprises a base part connected to the at least three pivotably connected parts, and wherein, when folded, the at least three pivotably connected parts form sides of the foldable box and the base part forms a base of the foldable box.

6. The foldable box claim 1, wherein the first surface of the first layer has printed information thereon.

7. A method of manufacturing a foldable box of claim 1 comprising:

providing a first sheet of material comprising a first layer and a second layer, wherein the first layer has a first surface and a second surface opposite to the first surface, the second surface has an adhesive coating, and the second layer covers the adhesive coating on the second surface;

cutting a form of the first sheet of material;

removing a part of the second layer to expose the adhesive coating of the first layer to obtain a second element;

providing a second element comprising at least three pivotably connected parts;

arranging for each of said at least three pivotably connected parts on the first element to be in contact with the exposed adhesive coating of the first layer;

folding said at least three pivotably connected parts inwards along bevelled groove lines to form a box like structure wherein said pivotably connected parts form the sides of the box;

removing the second layer from excess portion covering the adhesive surface of the first layer;

folding the excess portion inwards and gluing the first layer to the outer sides of the at least three pivotably connected parts so that adhesive surface of the first layer is towards outer sides of the second element to cover the second element and form an outer surface of the foldable box, and attaching the first element to the second element so that the first element covers all outer surfaces of the second element.

8. The method of claim 7, wherein the method further comprises processing the second element to provide the bevelled groove lines along connecting edges of the at least three pivotably connected parts, wherein the bevelled groove lines enable fitting of the at least three pivotably connected parts when folded.

9. The method of claim 7, wherein the second element, when folded, forms sides of the foldable box and the method comprises adhesively attaching a base element to the sides of the foldable box.

10. The method of claim 7, wherein the method comprises providing printed information on a first surface of the first layer of the first sheet of material.

* * * * *